W. J. MILLER.
PISTON.
APPLICATION FILED JUNE 28, 1919.

1,328,182.

Patented Jan. 13, 1920.

Witnesses
N. A. Thomas

Inventor
W. J. Miller

By Victor J. Evans
Attorney

UNITED STATES PATENT OFFICE.

WILLIAM JAMES MILLER, OF GOOSE CREEK, TEXAS.

PISTON.

1,328,182.  Specification of Letters Patent.  Patented Jan. 13, 1920.

Application filed June 28, 1919. Serial No. 307,302.

*To all whom it may concern:*

Be it known that I, WILLIAM J. MILLER, a citizen of the United States, residing at Goose Creek, in the county of Harris and State of Texas, have invented new and useful Improvements in Pistons, of which the following is a specification.

This invention relates to improvements in pistons or follower heads for pump cylinders, more particularly designed for oil wells.

The principal object of the invention is to provide means for renewing parts of the head to restore the same to its original diameter after the same has become worn and loosely fits the cylinder.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which.

Figure 1:
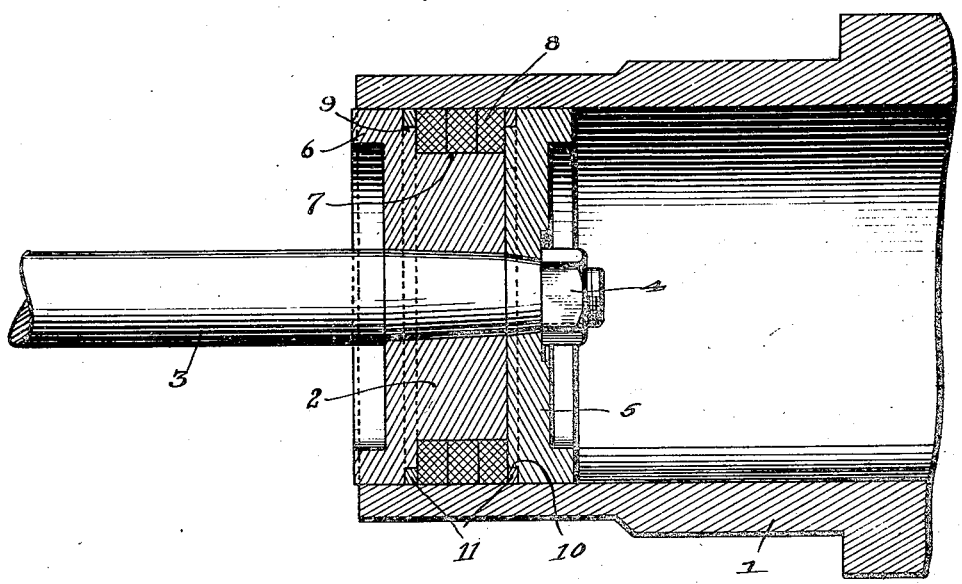
Figure 1 is a sectional view of a pump cylinder and head constructed in accordance with my invention.
Figure 2:
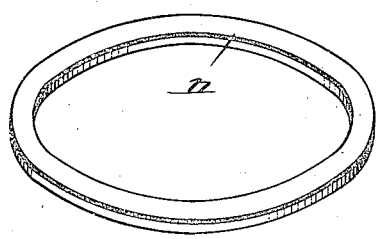
Fig. 2 is a view of one of the rims.

In these views, 1 indicates a pump cylinder and 2 indicates the plunger head or piston. This head is provided with the usual connecting rod 3, which passes through the head and is secured thereto by the nut 4. The head carries the usual follower plate 5, which is secured to the head by said rod and nut. The outer face of the piston or head is provided with the flange 6. The wall of the head is provided with the usual annual recess 7 to receive the packing rings 8. As will be seen, the recess 7 extends through the inner face of the head, so that the packing rings may be placed in the recess when the follower plate 5 is removed, and then when said plate is placed in position it will hold the rings in the recess. In carrying out my invention, I form a small annular groove 9 in the piston, which communicates with the bottom of the recess and said groove is of less depth than the recess. A like groove 10 is formed in the inner face of the plate 5 around its outer edge, and this groove communicates with the recess when the plate is in position. Into each of these grooves I place a metal ring 11, which is so formed as to make a tight fit with the walls of the cylinder, so as to prevent the escape of the fluid between the piston and cylinder. These rings engage the packing rings, as shown.

When the rings become worn they may be removed and replaced by new ones so that the life of the piston is lengthened and the piston made to fit the cylinder in a fluid-tight manner at all times.

What I claim is:—

A follower head having an annular recess in its walls, packing material located in said recess, a plate secured to said head and having an annular recess therein and a ring removably engaging said recess.

In testimony whereof I affix my signature.

WILLIAM JAMES MILLER.